United States Patent
Zhu (10) Patent No.: US 9,315,264 B2
(45) Date of Patent: Apr. 19, 2016

(54) HELICOPTER AND AIRCRAFT POWER DEVICE

(71) Applicant: Xiaoyi Zhu, Guangdong (CN)

(72) Inventor: Xiaoyi Zhu, Guangdong (CN)

( * ) Notice: Subject to any disclaimer, the term of this patent is extended or adjusted under 35 U.S.C. 154(b) by 346 days.

(21) Appl. No.: 13/745,235

(22) Filed: Jan. 18, 2013

(65) Prior Publication Data

US 2014/0312166 A1    Oct. 23, 2014

(30) Foreign Application Priority Data

Jan. 18, 2012  (CN) .......................... 2012 1 0015336

(51) Int. Cl.
  *B64C 27/467* (2006.01)
  *B64C 27/473* (2006.01)
  *B64C 11/18* (2006.01)
  *B64C 11/20* (2006.01)
  *B64C 21/02* (2006.01)
  *B64C 21/08* (2006.01)
  *B64C 23/00* (2006.01)

(52) U.S. Cl.
  CPC ............... *B64C 27/467* (2013.01); *B64C 11/18* (2013.01); *B64C 11/20* (2013.01); *B64C 21/025* (2013.01); *B64C 21/08* (2013.01); *B64C 23/00* (2013.01); *B64C 27/473* (2013.01)

(58) Field of Classification Search
  CPC .... B64C 27/00; B64C 27/467; B64C 27/473; B64C 11/18; B64C 11/20; B64C 21/025; B64C 21/08

USPC .......................... 244/17.11, 207, 23 R, 137.4
  See application file for complete search history.

(56) References Cited

U.S. PATENT DOCUMENTS

| | | | | |
|---|---|---|---|---|
| 1,519,866 | A * | 12/1924 | Marchetti | 416/99 |
| 4,473,335 | A * | 9/1984 | Henry | 416/20 A |
| 5,149,014 | A * | 9/1992 | Faller | 244/17.19 |
| 5,791,601 | A * | 8/1998 | Dancila et al. | 244/207 |
| 5,813,625 | A * | 9/1998 | Hassan et al. | 244/17.11 |
| 5,984,635 | A * | 11/1999 | Keller | 416/20 A |
| 6,131,849 | A * | 10/2000 | Nyhus | 244/17.11 |
| 7,093,788 | B2 * | 8/2006 | Small et al. | 244/12.2 |
| 7,766,274 | B1 * | 8/2010 | Jameson et al. | 244/17.11 |
| 8,043,046 | B2 * | 10/2011 | Guemmer | 415/115 |
| 2006/0049302 | A1 * | 3/2006 | Kennedy et al. | 244/17.11 |
| 2008/0121301 | A1 * | 5/2008 | Norris | 138/39 |
| 2009/0189011 | A1 * | 7/2009 | Bahadir | 244/17.11 |
| 2009/0206208 | A1 * | 8/2009 | Kennedy et al. | 244/7 A |

* cited by examiner

*Primary Examiner* — Justin Benedik (57) ABSTRACT

A helicopter and aircraft power device has a plurality of fluid inlets on a windward side of a blade housing and a plurality of fluid outlets on a leeward side in a manner that the fluid inlets communicate with the fluid outlets. The path where the fluid flows in the lengthwise direction on the windward side of the blade housing is far greater than the path where the fluid flows in the widthwise direction on the leeward side of the blade housing, generating a very large pressure difference between the leeward side and the windward side. The action of the centrifugal force and a suction force from a suction motor significantly increase the flowing speed on the windward side of the blade and in the fluid passage, generating bigger pressure difference on either sides of the propeller and thus forming more powerful lift force and driving force.

19 Claims, 5 Drawing Sheets

HELICOPTER AND AIRCRAFT POWER DEVICE

BACKGROUND OF THE INVENTION

1. Field of the Invention

The present invention relates to provide a power device, and particularly to an aircraft power device for the helicopter or aircraft to generate more power lift force or driving force.

2. Description of Related Art

A propeller has been widely used as a lift and power source in many areas such as aircrafts or helicopters. This propeller powered structure has been invented for more than a hundred years, and does not significantly change. Even though the structure is simple and easy to use, the structural limitations such as subtle difference in topography between a windward side and a leeward side and long blade offer not great lift force but high energy consumption and less competitive speed. The propeller disposed at a front of the aircraft tends to stall at the tip of the blade due to high speed. A great number of the fluid discharged onto the fuselage causes great energy consumption. In addition, the driving force thus obtained is not great. Therefore there is a need of a novel propeller structure to generate more lift force or driving force.

SUMMARY OF THE INVENTION

An object of the present invention is to overcome the above shortcomings, and provide a helicopter and aircraft power device which can generate more lift force. The propeller-powered aircraft can be offered with a second driving force to enlarge the total driving force.

The beneficial effects of the present invention are in that:

1. The lift force of the helicopter mainly comes from the different fluid paths. With the action of the suction motor, the path where the fluid flows in the lengthwise direction in the blade housing of the propeller within the fluid passage and on the windward side is difference from the path where the fluid flows on the leeward side in the widthwise direction of the blade housing. Such a difference results in greater pressure difference and more powerful lift force. The windward side under the action of the suction force and the leeward side at the natural status lead to different flowing speed and more lift force.

2. The power of the propeller-powered aircraft comes from the first forward driving force generated by the pressure difference, or the joint driving force formed by the first backward counteraction force generated by the pressure difference and the second counteraction force generated by the fluid discharge from the propeller.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

For convenience of description, the outer and inner surfaces of a blade housing of a propeller for a helicopters and an aircraft are respectively the windward side and leeward side. The interior of the blade housing along the lengthwise direction is a fluid passage.

An aircraft power unit includes a propeller. Said propeller includes a cover body and a plurality of blade housings around and connected to the cover body. Said each of the blade housings has a windward side and a leeward side with a fluid passage in the middle. On the windward side is provided with at least one fluid inlet. On the leeward side is provided with at least one fluid outlet. In the middle is the fluid passage communicating the fluid inlet and the fluid outlet.

In the above structure, the fluid outlet is, preferably, provided in the vicinity of the rear portion of the leeward side along the lengthwise direction of the blade housing so as to facilitate the fluid to flow from the fluid inlet through a long path of the fluid passage and then discharge downwardly, relatively parallel, or backward out of the fluid outlet (aircraft power device). The rotation of the propellers forms a fast-rotating circular fluid layer to concentrate the fluid exhausted by the propellers in the circular fluid layer without outward dispersion. The fast-rotating circular fluid layer and the exhausted fluid together form a grater driving force. The current helicopter or aircraft propellers discharge the fluid outward to diffuse around, which cannot concentrate to form the driving force.

In the above-mentioned structure, it is preferable that the fluid outlet is provided on one side of the leeward side of the propeller blade, i.e. the side opposite to the rotating direction of the propeller blade. The fluid ejection angle is in the same direction as fluid discharging direction of the propeller blade, so that the fluid at the same angle on one side of each propeller blade can be injected at higher speed to drive and facilitate the propeller to rotate more smoothly.

In the above-described structure, preferably, in a fluid passage along the lengthwise direction of the blade housing is provided with an arc-shaped, spiral-shaped, or a regular or irregular wavy spoiler surface which is used to extend path length which the fluid flows through. Alternatively, within the fluid passage is provided with a suction tube which can be straight, arc, or spiral. Alternatively the fluid passage has an upper channel and a lower channel, or has a left channel and a right channel.

The fluid passage which allows the fluid to flow from the fluid inlet at the windward side into the extended fluid passage can further pass through the suction tube. Alternatively, after the upper and lower channels communicate with a suction motor, the fluid path significantly increases, making big difference between it and the original one in which the fluid passes over the width of the propeller blade and thus generating greater lift force and driving force. With the use of small power of the suction motor, the extend path of the spoiler surface or the suction tube, the lift force and the driving force can be significantly increased.

Preferably, in the above-described structure, the windward side of the blade housing along the lengthwise direction is provided with a plurality of fluid inlets which may be round, rhombic, oval-shaped, strip-shaped, curved, triangular, fan-shaped and multi-faced. The centerline of the inlet is in parallel to the rotating angle of the propeller, which helps to introduce the fluid into the fluid passage.

Preferably, in the above-described structure, the suction motor is located in the cover body, and has an ejecting port uniformly distributed around a rear of the cover body in the same discharging direction of the propeller. When the propeller is rotating, the fluid ejected from a plurality of ejecting ports forms a conical-like fluid layer due to the high-speed movement to at least partially block the fluid discharged backward to the aircraft from the propeller in order to reduce the fluid resistance.

In the above structure, it is preferably to provide the suction motor inside or outside the aircraft to communicate with the fluid passage via a connection tube. Since the suction direction of the suction motor is the same as direction of centrifugal movement, the communication of the suction motor with a suction tube through a suction port at a rear of the fluid passage generates more powerful suction force to draw the fluid into the fluid passage with the extension of the suction tube, without taking into consideration of balance problem due to the rotation of the propeller inside the cover body caused by the suction motor. The great increase in the volume of the suction motor and the power forms much pressure between the front and the rear of the propeller.

In the above configuration, preferably, the windward side of the blade housing along the length direction has a plurality of fluid inlets communicating with the fluid passage. When the propeller rotates at high speed, a very large suction force generates in the same direction of the fluid passage so that fast two-layered movement forms on the blade housing and inside the fluid passage which disconnects but connects when passing through the fluid inlets. This greatly increases the path which the fluid flows through and forms a large pressure difference between the front and the rear.

In the above-mentioned structure, it is preferable that the fluid passage inside the blade housing along the lengthwise direction can be partially or integrally provided. The path which the fluid flows in the lengthwise direction of the windward side is much larger than the path in the widthwise direction of the leeward side. Due to the different paths in the lengthwise and widthwise directions and the action of the great centrifugal force, a large pressure difference and greater lift force generate.

In addition, by means of imitating the feather structure of birds which has been subject to evolution for hundreds of millions of years, layer-by-layer feathers allow the fluid to be partitioned in a layered manner. The multilayered communicated feathers will not appear any stall phenomenon caused by departure of the fluid from the feathers, no matter what the angle and flight speed is. Such a problem has seriously restricted the propeller speed and flight speed of a propeller driven aircraft. Therefore, the present invention imitates the multilayer feather structure to avoid the occurrence of stall phenomenon at the propeller tip so that the driving force flight speed and security for such an aircraft can be greatly improved, solving the problem of the propeller stall which constraints the propeller-powered aircraft for years.

First Embodiment

Figure 1:
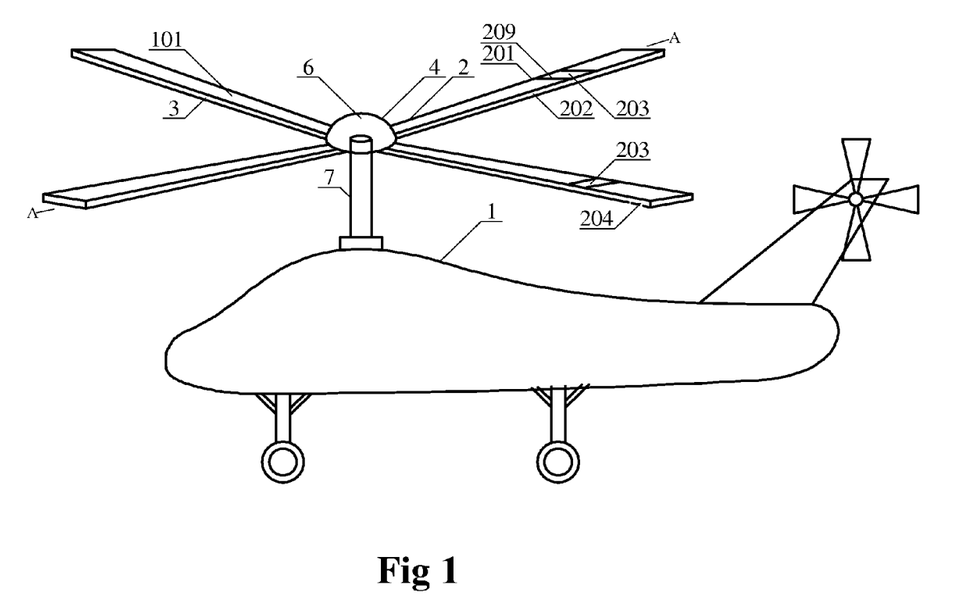
FIG. 1 is a schematic view of a schematic side view of a helicopter and aircraft power device according to a first embodiment and a second embodiment of the invention.
Figure 2:
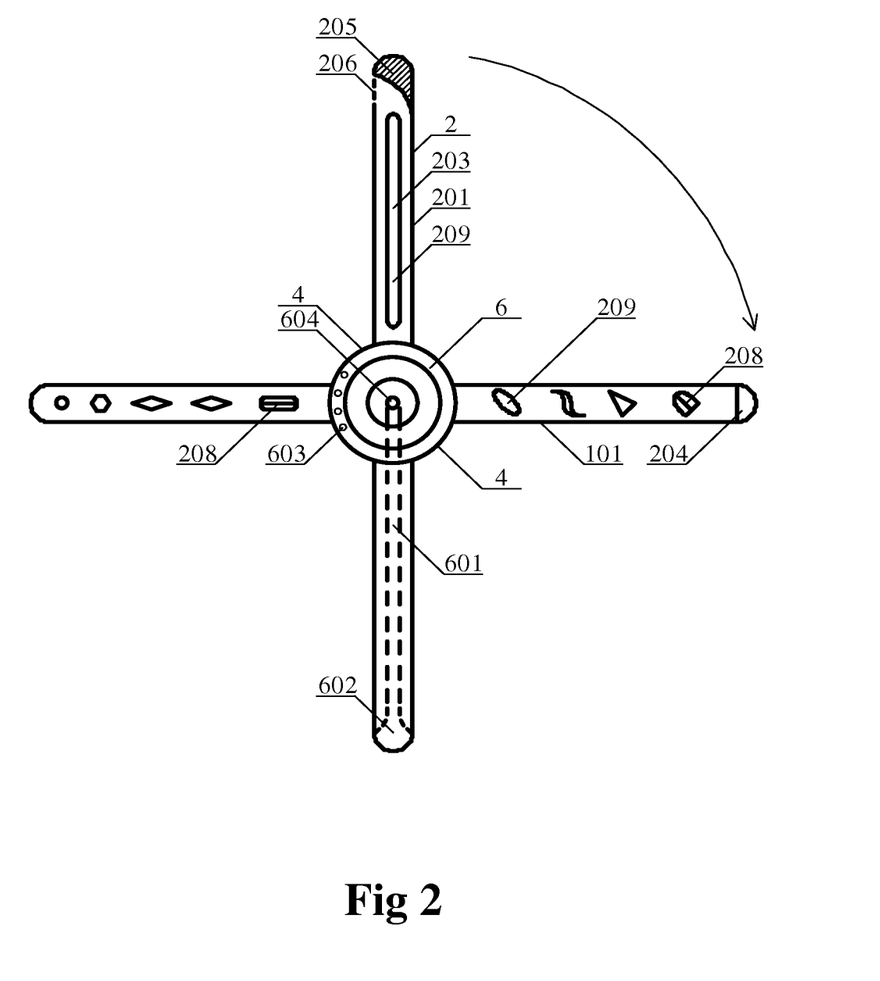
FIG. 2 is a schematic top view of a propeller of a helicopter and aircraft power device according to a first embodiment and a second embodiment of the invention.
Figure 3:
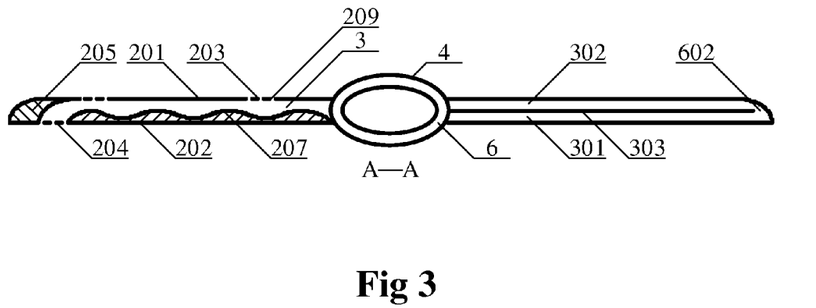
FIG. 3 is a schematic, cross-sectional view of FIG. 1 in line A-A.

A helicopter, as shown in FIG. 1-3, includes an aircraft body 1 and a power device of the invention. A propeller 101 of the aircraft lift device is provided on the aircraft body 1. The propeller 101 has a plurality of blade housings 2 each of which has an arc windward surface 201 and a flat leeward side 202. A fluid passage 3 is provided in the housing 2 along its lengthwise direction. The fluid passage 3 is not wide. A plurality of fluid inlets 203 is respectively provided at the fluid passage 3 and the corresponding windward sides of the blade housings 2, and respectively has a controller 209. The fluid inlets 203 respectively communicate with fluid outlets 204 provided respectively on rears of leeward sides of blade housings 2. A cover body 4 connects to and fixes to each of the blade housings 2.

The shape of the each of the fluid inlets 203, as shown in FIG. 2, either for the left blade or the right blade, can be circular, rhombic, multi-faced, stripe-shaped, oval-shaped, arc, lineal, triangular, fan, etc. a centerline 208 of each of the fluid inlets 203 is in parallel to the circular angle in the rotating direction of propeller (except for the round and rectangular shapes) so as to facilitate to introduce the fluid into the fluid passage. Alternatively, the centerline 208 can be in parallel to the blades as shown at the left side of FIG. 2. Each shape of the fluid inlets 203 may be a single shape or several shapes which are repeatedly arranged. The following illustration is taking the round inlet as an example.

When the propeller is working, the high-speed rotating propeller generates a great centrifugal force which spins outwardly the fluid at high speed in the same direction where the fluid flows in the fluid passage. The movement of the fluid outwardly by the centrifugal force generates very large suction force and fluid pressure. The symmetric, uniform arrangement of the circular fluid inlets 203 on the windward sides 201 of the blade housings 2 in the lengthwise direction contributes to draw and extrude the fluid around the windward sides 201 into the fluid passage 3 from the fluid inlets at high speed. The centrifugal force drives the fluid to move linearly at high speed, and then exhaust downward at high speed from the fluid outlets to form a layer of fluid conformal to each windward side 201 near each of the fluid inlets and another layer of fluid which rapid flows through the fluid passage 3. These two layers communicate with each other with the balance of high flow speed, which do not affect the fluid on the upper part of the windward side to go around to the leeward side and discharge downward. After the nearby fluid is introduced into the fluid passage through the fluid inlets on the windward sides, the fluid travels a long distance to reach the rear of the fluid passage and be discharged from the fluid outlets 204 at high speed. The path that the fluid passes in the lengthwise direction of the blade housing is greater than the path that the fluid flow over the leeward side of the blade housing in the widthwise direction. With the action of the centrifugal force, the fluid speed is much higher than the fluid moving speed on the leeward side in the natural status. This generates greater pressure difference between the upper and lower parts of the propeller and greater lift force.

The centrifugal force is in the same direction as the moving direction of the long fluid passage to accelerate the flow rate greatly. Then the centrifugal force draws the fluid from the fluid outlets 204 of the leeward sides, and drain downward the fluid in mass at a speed higher than the propeller to high-speed eject the fluid in the direction of discharging direction of the propeller. Due to the high-speed rotation of the propeller, a high-speed rotating circular fluid layer with a certain thickness forms. At this moment, the slower fluid discharged downward by the propeller is collected in the circular fluid layer high-speed ejected from the fluid outlets and will not dispersed around, jointly generating a greater driving force. One of the inherent characteristics of the propeller is to discharge the fluid downward which then is dispersed around, resulting in not great driving force. The above structure of the invention significantly increases the driving force of the propeller.

Usually the length of the blade housing is about 20 times the width thereof. With the action of the powerful centrifugal force to draw the fluid to flow very fast through such a long path, the speed on the windward side and within the fluid passage is much higher than the leeward side in widthwise direction, resulting in extremely pressure difference between the upper part and the lower part of the propeller when in rotation. A high pressure zone generated by low-speed fluid layer on the leeward side of the propeller instantaneously transfers to a low pressure zone generated by high-speed flow on the windward side. The greater the pressure difference, the faster the transfer speed, the greater the lift generates, which is a natural law. It's just as the flow of water from the top down: the larger the distance difference, the faster the water flows, the greater driving force generates. The pressure difference of the circular fluid between the upper part and the lower part when the propeller is rotating is extremely large, generating a great lift force and driving force as well. It is noted that such a lift force and driving force mainly come from the large centrifugal force in the same direction of the fluid direction in the fluid passage, which draws the fluid near the fluid inlets on the windward side into the fluid passage. After a long path, the fluid is discharged from the fluid outlets. The long path and high flowing speed contribute to result in huge pressure difference between the fluid layers of the windward side and the leeward side. At such a status, greater driving force and lift force are generated as a power source for the helicopter.

The fluid inlets and the fluid outlets are provided with controllers 209. Each of the controllers 209 has a control panel. By means of the control panels, the angle of air intake can be adjusted to control the amount of the air intake and thus control the lift force and the driving force. According to the actual need to adjust the air intake, it is made much easier to control the helicopter or the aircraft.

The lift force and the driving force generated by the power device of the invention are much greater than the prior art. The traditional helicopter has subtle difference in topography (such as arc and flat surface) in widthwise direction between the windward and leeward sides. Therefore, the prior art cannot increase the very long path for the fluid passage on the windward side in the lengthwise direction for the propeller. The prior art cannot uses the centrifugal force to produce a high-speed fluid layer, and neither generate the very large difference in flow speed in order to form a very large pressure difference for generating the great lift force and driving force. Unlike the prior art, the invention not only increases the loads capacity with improved flight speed for the helicopter but also allows the helicopter more flexible in the air. The improved movement speed and load capacity has made the helicopter reborn to be the one which has not defined in the modern sense of the helicopter.

In addition, the traditional propeller has long blade housing, causing large load and bad rotating speed. Whereas, the pressure difference between the upper part and the lower part of the propeller is very large, resulting in very large lift force, so that the length of the blade housing can be shorter with fewer loads and thus the propeller can rotate faster to generate greater lift force and driving force.

In another embodiment, it is the same as the above embodiment, except that a front portion and a rear portion of a top of a helicopter fuselage are respectively provided with a propeller as mentioned above. Alternatively, a propeller is provided on a right side and a left side of the helicopter fuselage to generate greater lift force and driving force (not shown).

In still another embodiment, it is the same as the above embodiment, except that two propellers are provided at an upper location and a lower location above the helicopter. That is, another above-mentioned propeller (not shown) is added above the helicopter. The helicopter having double-tier propellers provides greater lift force and driving force for a heavy-loading helicopter. It is noted that the traditional helicopter discharges the fluid downward, not able to generate greater lift force and driving force. Whereas, the upper and lower propellers jointly form a very large pressure difference which generates greater lift force and driving force.

In another embodiment, a plurality of fluid inlets 203 is provided on the windward side corresponding to the fluid passage 3 in a front section of the blade housing. A plurality of fluid outlets 204 is provided on the leeward side corresponding to the rear section of the fluid passage 3. The fluid inlets locate between the windward side and the leeward side at the rear of the propeller blade, and are used to discharge the fluid in the direction in parallel to the propeller.

By changing the flowing direction of the fluid over the blade housing to be the lengthwise direction of the windward side and the widthwise direction of the leeward side, along with the action of the centrifugal force on the windward side, a greater lift force can be generated. Such a development of greater lift force grants the helicopter a totally new vision.

Embodiment 2

Another helicopter shown in FIG. 1 through FIG. 3 is the same as the Embodiment 1, except the following description. The fluid inlets 203 can be oval. The centerline 208 of the fluid inlets is in parallel to the circular direction when the propeller is rotating so that the fluid is more easily introduced into the fluid passage when in rotation. An arc, spiral, a regular or irregular wavy spoiler surface 207 is further provided along the path where the fluid flows in the fluid passage. For example, the arc spoiler surface adds at least more than ⅓ of the original path so that the distance of the fluid passage in the blade housing is about 30 times the distance in the widthwise direction. Also with the action of the centrifugal force, the pressure difference between the windward side and the leeward side is very large, generating very large lift force and driving force. If the spiral spoiler surface is provided in the fluid passage, the path where the fluid flow can be extended. The wavy spoiler surface will be best spoiler surface. The surface imitating the natural regular or irregular wave has not only the increased path but also the reduced fluid resistance.

An arc deflector block 205 is further provided. The fluid smoothly flows over the arc deflector block 205 to eject downward from the fluid outlets 206 at the rear of the leeward side opposite to the blade housing in the rotating direction of the propeller. Referring to the top of FIG. 2, when the propeller rotates fast to generate a large centrifugal force to draw the fluid into the fluid passage 3 through the oval fluid inlets 203 on the windward side of each blade housing, the long straight path and power centrifugal force result in high flow speed of the fluid which will be then discharged from the fluid outlets 206 over the arc deflector block 205 from a high-speed circular fluid layer. The fluid discharged downward from the propeller is collected in the fluid layer, jointly generating a great driving force.

The rotation of the windward side and the leeward side of the propeller form two circular fluid layers at different speed, one being at the top and the other being at the bottom. This generates an extremely large pressure difference. The low pressure zone transfers toward the high pressure zone. The larger the pressure difference, the faster the pressure zone transfers. This is a natural law. The higher the fluid speed on the windward side when the propeller is rotating, the larger the pressure formed on the leeward side at natural status, the faster the pressure difference transfers. In other words, the greater the driving force, the greater the lift force and the driving force the helicopter obtains than the prior art.

The driving force of the helicopter is mainly based on the pressure difference, rather than the propeller which discharges the air downward as in the prior art. Therefore, a novel helicopter with more powerful driving force is therefore realized. The source of such a driving force does not come from the downward discharge from the propeller as in the prior art, but instead the fluid flowing from the windward side in the lengthwise direction to the leeward side in the widthwise direction. In addition to the flowing path of the above fluid, the centrifugal force also contributes to the huge pressure difference which significantly increases the driving force. The transfer from the high pressure zone to the low pressure zone adds more driving force. To increase the lift force and speed for the helicopter only needs to accelerate the fluid to flow over the windward sides of the blade housings of the propeller. This makes the invention very simple and convenient, providing the development of future helicopter a new vision.

Embodiment 3

As shown in FIG. 1-4, it is the same as the above, except the following description. The fluid passage 3 of the wavy spoiler surface 207 in each of the blade housings is provided with straight-shaped suction tube 601 having a length approximately equivalent to the fluid passage 3. The strip-shaped fluid inlets 203 communicate with a suction motor 6 in a cover body 4 through a connection tube 604. The fluid outlets 206, 204 are not used in this example. Alternatively the fluid outlets of the controller 209 are closed. The fluid inlets 203 communicate with the suction tube through an opening 602. Referring to the lower part of FIG. 2, a discharging port of the suction motor around the cover body 4 can be a plurality of uniformly distributed circular ejecting ports 603.

When the propeller and the suction motor are working, great centrifugal force and suction force that are generated draw the fluid around the fluid inlets on the windward side into the fluid passage. The fluid then enters the connection tube 604 communicating with the suction tube 604. The fluid that suctioned by the suction motor at high speed is ejected downward through the circular ejecting ports 603 uniformly distributed under the cover body 4. With the high-speed rotation of the propeller, the fluid ejected from the circular ejecting ports 603 uniformly distributed under the cover body forms hollow tapered fluid layer which has a certain thickness and rotates at high speed that is higher than the surrounding velocity. Most of the fluid is discharged toward the aircraft fuselage to generate an artificial fluid resistance, greatly reducing the fluid resistance. Since the emergence of the helicopter, the fluid discharged downward by the propeller has resistance against the aircraft fuselage, seriously affecting the driving force and lift force.

Figure 4:
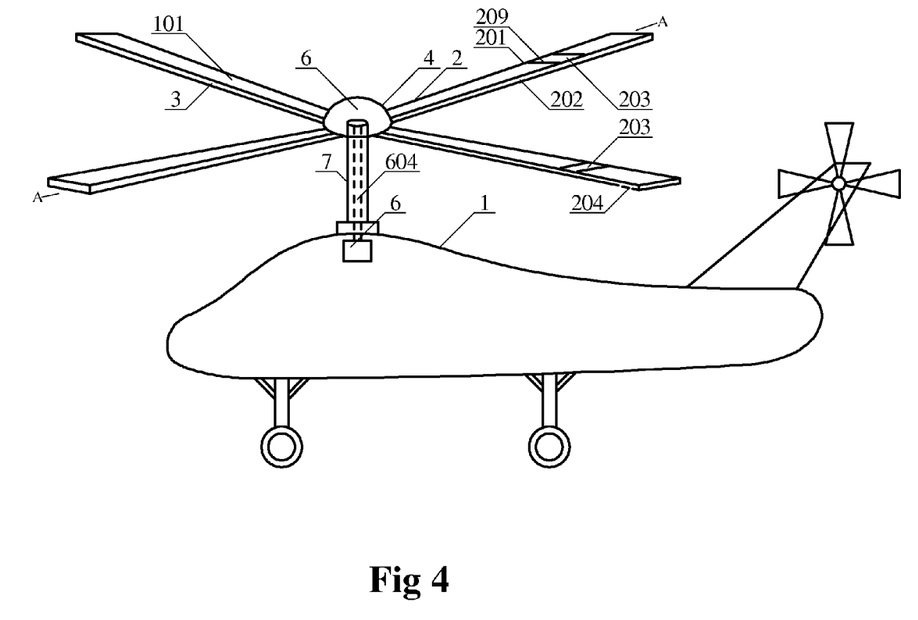
FIG. 4 is a schematic side view of a helicopter and aircraft power device according to a third embodiment of the invention.

In another embodiment, as shown in FIG. 4, this embodiment is the same as the above embodiment, except that the suction motor is located within the fuselage 1, and communicates with the suction tube 601 in the fluid passage through the connection tube 604, the hollow shaft 7 and the hollow cover body 4. Since the suction motor is provided in the fuselage, there is no balancing problem in the cover body, increasing the volume and the power and therefore higher suction force. The flowing speeds on the windward side and in the fluid passage thus significantly increase. The larger pressure difference between the windward side and the leeward side will lead to greater lift force.

Obviously, straight suction tube is located within the fluid passage of the wave shaped spoiler surface to extend about twice the path where the fluid flows. The difference in path between the windward side and leeward side in the lengthwise and widthwise directions increases to more than 40 times. If the spiral or arc tubes are used, the path is extended for the fluid to flow. With the control of the suction motor, it is easy to accelerate the fluid on the windward side and in the fluid passage, generating several times the pressure difference. Thereby tens-times of the lift force and driving force larger than that the existing helicopter has can be generated. Such a helicopter is not what has been defined.

The fluid passage can be the space between the windward side and the leeward side. The space can be spiral channel or a straight tube, or any channels having other geometric shapes.

Embodiment 4

Figure 5:
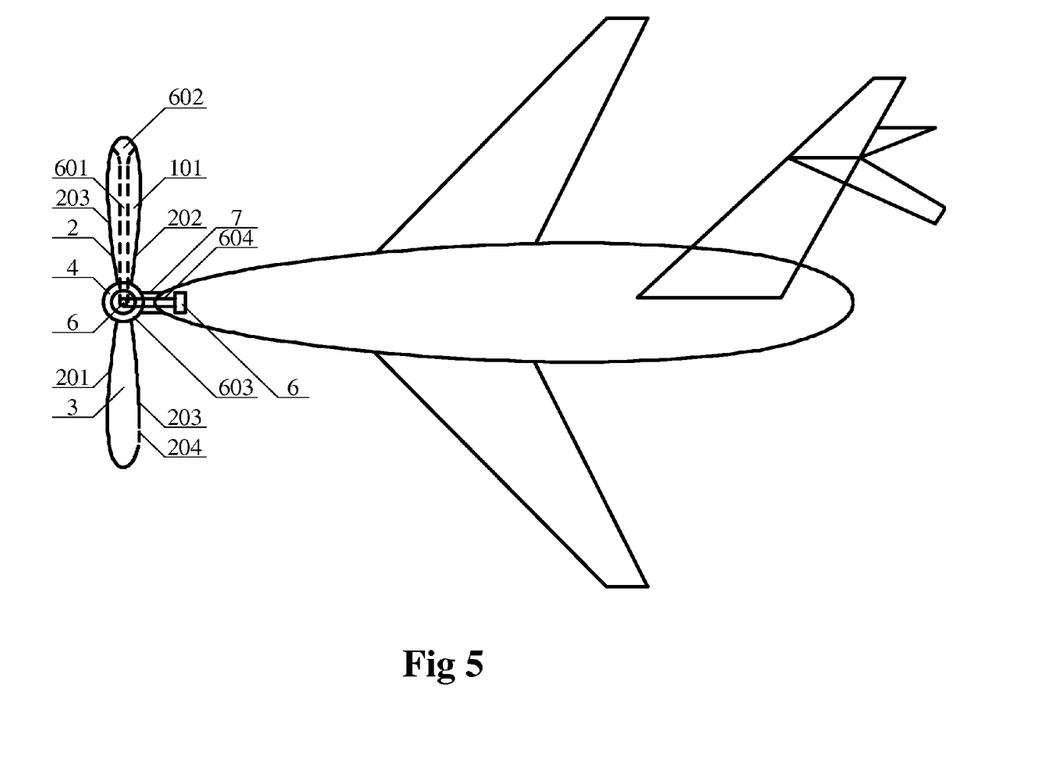
FIG. 5 is a schematic side view of a helicopter and aircraft power device according to a fourth embodiment, a fifth embodiment and a sixth embodiment of the invention.

As shown in FIG. 2, FIG. 3, FIG. 5, a propeller aircraft includes a fuselage, wings, and the above aircraft power device. The propeller 101 of the aircraft power device is provided at a front of an aircraft fuselage as a source of driving force.

The driving force of the conventional propeller-powered aircraft is based on the counteraction force generated by the discharge of the great number of the drawn fluid. The faster the rotation, the more the past fluid, and the greater the driving force generates. At the same time, a large number of fluid flows from front to back and then is thrown toward the rear of the aircraft. A large amount of fluid thrown toward the aircraft fuselage also generates a great resistance.

In this present embodiment when the propeller 101 is working, the generated centrifugal force high-speed throws the fluid outwardly from the inner side. Since the centrifugal force is in the same direction as the fluid passage to high-speed throw the fluid from the center of the propeller to the periphery, an extremely powerful suction force and fluid pressure generate at each fluid inlet 203 on the windward side so that the fluid around each fluid inlet 203 is high-speed suctioned into the fluid passage 3 in a manner of being conformal to the windward side and the interior of the fluid passage 3. Therefore, two high-speed fluid layers form separately at the beginning and combine together after passing through the fluid inlets 203 at a balanced speed. Since the fluid passes over the windward side and through the fluid passage in the lengthwise direction of the blade housing, the movement speed is higher than the fluid movement speed over the leeward side in the widthwise direction of the propeller blade under the action of the centrifugal force. A two-layered circular fluid layer in which the two sub-layers communicate with each other with high speed movement is formed on the windward side 201. The fluid layer having the movement speed higher than the leeward side 202 of the propeller has a pressure difference between the fluid layers of the front and rear parts of the propeller due to the different movement speed. The fluid movement speed is lower on the leeward side to generate a high-pressure fluid layer which will transfer to the lower-pressure fluid layer at the front part. The pressure difference generates the great forward driving force. At the same time, the fluid is discharged toward the rear part of the propeller at high speed to generate the counteraction force.

The driving force includes the forward driving force generated due to the pressure difference between the front part and the rear part of the propeller, and the backward counteraction force generated by the fluid discharged at the rear part. These two forces simultaneously drive the aircraft to fly forward. The higher the pressure difference, the larger the driving force is. The flight speed is significantly improved. Therefore, the big pressure difference between the front and rear parts of the propeller can generate more powerful driving force than the prior art. In addition, these two driving forces jointly form the more powerful driving force, driving the aircraft faster with saved energy. Such an aircraft power device has created a new vision for the propeller-powered aircraft.

The fluid inlets 206 eject backward the high-speed suctioned fluid from the rear part of the fluid passage and the opposite side of the blade housing when the propeller is rotating (referring to the top of FIG. 2). Due to the high-speed rotation of the propeller, the fluid ejected from the fluid outlets 204 of each blade forms a high-speed circular fluid layer having a certain thickness. The movement speed of the fluid layer is far higher than the fluid movement speed generated by the propeller. Since the central part of the fluid discharged by the propeller is slight faster than the peripheral part of the discharged fluid, and the peripheral part of the fluid diffuses outward, so that the high-speed circular fluid layer concentrates the diffused fluid to be in the circular fluid layer. This contributes to more powerful driving force. The fluid ejected by the fluid outlets at the opposite side of the blade housing when the propeller is rotating, and the fluid discharged by the propeller jointly generate larger driving force. Furthermore, the fluid outlets of each blade housing eject at high speed the fluid on the same angle on the opposite direction to the rotation, helping the propeller to rotate fast to achieve the purpose of energy saving.

Conventional turboprop engines typically cannot operate too fast. If the speed is too high, the tip of the blade will exceed sonic speed and reduced efficiency, causing the fluid split out of the blade housing to occur the stall. Therefore the prior art needs a lot of blades housings which add unnecessary weight and energy consumption. Whereas, the present invention imitates the bird feather structure which has been through the evolution for hundreds of millions of years. The fluid passes over multilayer feathers in which the layers communicate with each other, regardless of the speeds and angles. It will not appear the stall phenomenon due to splitting out of the feathers. A plurality of fluid inlets is provided on the windward side to introduce the fluid into the fluid passage, and a plurality of fluid outlets is provided to discharge the fluid. Therefore, the part of the fluid passing the tip of the blade is greatly reduced. The two-layered fluid layer in which the two sub-layers communicate with each other is formed on the windward side 201 and in the fluid passage 3. It's like the multilayered feathers. Even in high-speed rotation, no stall phenomenon will occur due to the fluid split from the blade housings. Therefore, the propeller can drive various aircrafts at higher speed with saved energy.

Usually the length of the blade housing of the propeller is about 5 times the width thereof. The length of the fluid passage 3 is about 5 times the width of the blade housing. The fluid inlets on the windward side communicate with the fluid passage, forming a rapid fluid layer having an inner sub-layer and an outer sub-layer to form a great pressure difference between the front part and the rear part of the propeller. The fluid pressure difference generates a first forward driving force and the fluid ejected from the rear part generates a second driving force jointly form a greater driving force.

In another embodiment, as shown in FIG. 3, this embodiment is the same as the above embodiment, except the following description. An arc spoiler surface 207 is provided in the fluid passage 3 to increase the path where the fluid passes at least about ⅓ times so as to increase the flowing speed and pressure difference. The propeller can be further provided on the right and left wings of the aircraft, on the fuselage or at the rear of the fuselage to drive a bigger aircraft (not shown).

Figure 6:
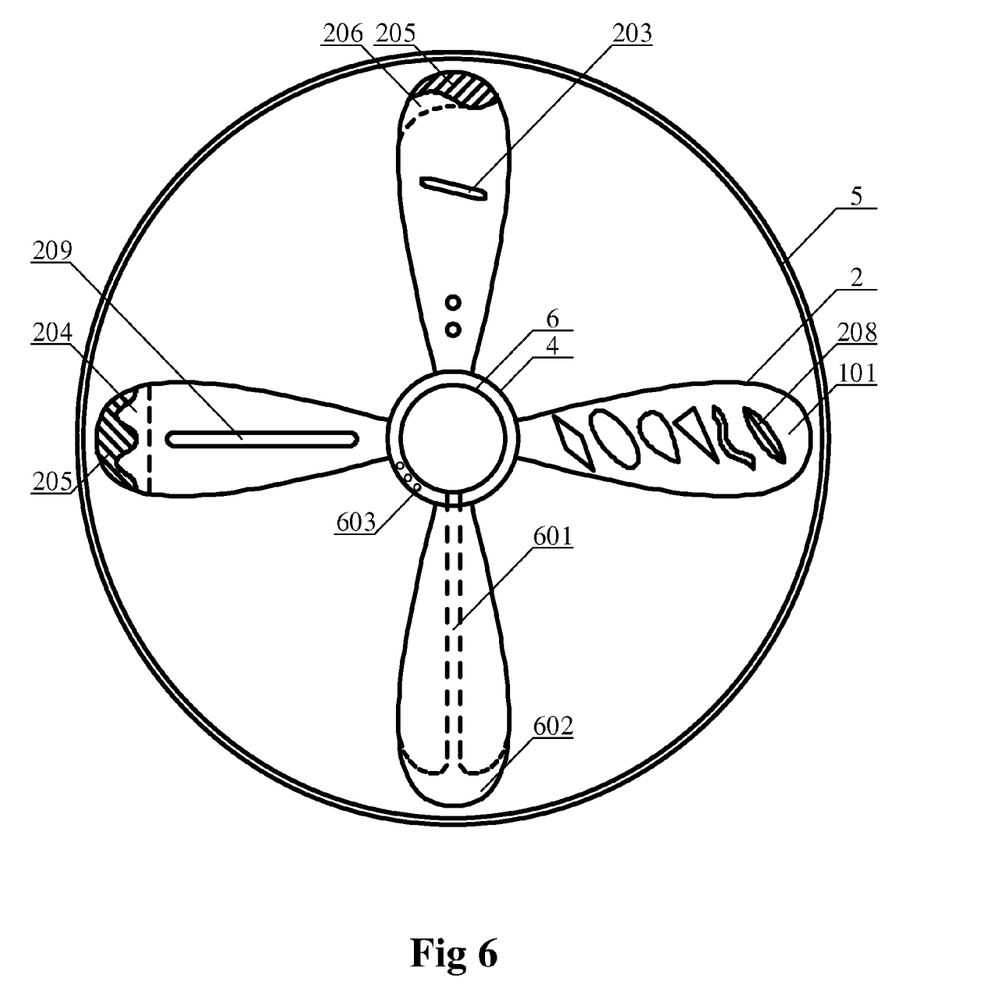
FIG. 6 is a schematic view of a propeller of a helicopter and aircraft power device according to a fourth embodiment of the invention.

In another embodiment, as shown in FIG. 6, this embodiment is the same as the above embodiment, except the following description. The propeller is provided in a circular tube 5 whose rear part and front part communicate with each other. The circular tube is provided on the aircraft fuselage or other parts of the aircraft fuselage to drive the aircraft. At least one propeller is provided in the circular tube in rows, which can be compressed in scales to generate larger driving force (not shown).

Embodiment 5

As shown in FIG. 2, FIG. 3, FIG. 5, and FIG. 6, this embodiment is the same as the above embodiment, except the following description. The fluid outlets are closed by the controller 209, or the fluid outlets are not provided. Referring to the bottom of FIG. 6, the suction tube in the fluid passage can be a straight tube or threaded tube which has inner threads or inner and outer threads to increases the path where the fluid passes. A suction motor 6 is provided in the cover body 4 in a manner to communicating an opening 602 at the rear through the suction tube 601 so that the suctioned fluid is ejected at high speed in the same direction of discharging by the propeller from the circular ejecting port 603 uniformly distributed around the periphery of the rear of the cover body 4. As the high-speed rotation of the propeller, the circular fluid layer with high-speed movement forms. When the current propeller discharges the fluid, the central part of the fluid is discharged faster than the periphery thereof, and most of the central fluid is discharged toward the surface of the fuselage, generating an artificial fluid resistance. Since the suction motor has higher rotating speed, the circular fluid layer formed by the high-speed movement and ejected from the ejecting port when the propeller is rotating has a larger flowing speed than the fluid discharged by the propeller. As the mask cover rotates as the propeller rotates at high speed, another a circular fluid layer having a certain thickness and angle with high movement forms and gas higher flowing speed than that generating by the propeller. The fluid resistance generated by the fluid which is ejected toward the fuselage by the propeller can be at least partially blocked to greatly reduce the fluid resistance and therefore achieve the purpose of energy saving.

When the propeller and the suction motor 6 are rotating, the centrifugal force generated by the propeller and the suction force generated by the suction motor work together on each of the fluid inlets 203 on the windward side so that the fluid layers having two high-speed sub-layers form on the windward side and the fluid passage 3. Since the suction tube 601 which is a straight tube is about equal to the inner length of the fluid passage 3 increases fluid path to double, the path where the fluid sub-layers on the windward side and the fluid passage pass increases double. If the suction tube 601 has inner and outer threads, the path where the fluid passes increases tremendously. With the action of the centrifugal force and the suction force of the suction motor, the flow speed in the fluid passage in the lengthwise direction of the windward side is far greater than that in the widthwise direction of the leeward side at natural status so that a greater pressure difference between the windward side and the leeward side of the propeller forms. The fluid pressure transfers at high speed from the rear to the front, forming a greater forward driving force as a first forward driving force. The larger the pressure difference between the windward side and the leeward side, the larger the first driving force thus generated. Meanwhile, the propeller discharges the fluid backward to generate a second counteraction force as a second driving force. These two driving forces jointly form a greater driving force.

In another embodiment, as shown in the right side of FIG. 3, it is the same as the above, except the following description. The fluid passage in the blade housing is the passage partitioned by a spacer 303 into an upper sub-passage and a lower sub-passage communicating with each other through an opening. The upper sub-passage 302 communicates with each of fluid inlets on the windward side. The lower sub-passage 301 communicates with the suction motor.

With the centrifugal force and the suction force by the suction motor, these two forces work in the same direction so that the fluid around each of the fluid inlets on the windward side is suctioned into the upper sub-passage 302, turning through the opening 602 and going through the lower sub-passage 301. The path where the fluid passes thereby greatly increases. The fluid is then ejected backward at high speed from the ejecting port 603 of the cover body. The upper and lower sub-passages can be further provided at the right and left sides of the fluid passage 3 or in a diagonal manner.

In another embodiment, as shown in FIG. 5, it is the same as the above, except the following description. The suction motor 6 is provided in the fuselage to communicate with the upper sub-passage 302 and the lower sub-passage 301 in the fluid passage through the connection tube 604 and the hollow shaft 7 of the propeller. The suction motor 6 is provided outside the cover body of the propeller, therefore it need not to consider the balance problem when the propeller is rotating. The bigger suction motor and the more power can be chosen for generating more powerful suction force to draw the fluid in the fluid passage and on the blade housing of the windward side at high speed and generate higher flowing speed so as to form larger pressure difference between the front and the rear of the propeller. Thereby, more powerful driving force can be generated.

The suction motor can be provided inside or outside the fuselage to accelerate the fluid to flow through the fluid passage and over the windward side in a multi-layer manner. The low-speed fluid at natural status over the leeward side and the above accelerated fluid jointly form a larger fluid pressure difference between the front and the rear of the propeller. A larger driving force is thus generated.

Obviously, the length of the blade housing of the propeller is about 5 times the width thereof. Additionally, the suction tube increases the path where the fluid passes through the fluid passage to double. That is, the total increase in the fluid path, including the length and the width, is about 10 times the original one. Meanwhile, with the control of the suction motor, the extremely suction force makes the flowing speed in the lengthwise direction ten times, even more, the width direction. Therefore at least 10 times pressure difference generates, rendering the first driving force larger than the second driving force. It can be achieved by using not much driving force. For example, additional blades are provided on the windward side of the propeller can increase the flowing speed and greatly improve the driving force of the propeller. No matter what the speed the current aircraft has, the load capacity can be significantly improved.

The increase in the fluid path by means of extending the fluid passage and adding the spoiler surface or the suction tube or two-layered passage, along with the communication with the suction motor, form a greater pressure difference to generate the greater driving force with saved energy.

In the invention, it can greatly increase the driving force of the aircraft by only increasing the fluid speed on the windward side and in the fluid passage.

The fluid inlets and the fluid outlets are provided with controllers 209. Each of the controllers 209 has a control panel. By means of the control panels, the angle of air intake can be adjusted to control the amount of the air intake and thus control the lift force and the driving force. According to the actual need to adjust the air intake, it is made much easier to control the helicopter or the aircraft.

Embodiment 6

It is the same as the example 5, except the following description. A plurality of fluid inlets 203 is provided on the leeward side of the blade housing in the lengthwise direction. A plurality of fluid outlets 204 is provided at the rear thereof, as shown in the bottom of FIG. 5. The fluid outlets are in the same direction as the discharging direction of the propeller.

When the propeller is rotating at high speed, the centrifugal force is the same direction as the plurality of fluid inlets 203 on the leeward side, the fluid passage 3 and the fluid outlets 204. The fluid flows from the windward side to the blades and then the leeward side so as to form a two-layered high-speed moving fluid layer on the leeward side and in the fluid passage 3. It results in a large pressure difference between the leeward side and the windward side due to the difference in flowing speed, backwardly generating the first counteraction driving force. Meanwhile the high-speed fluid ejected from the fluid outlets 204 and the fluid ejected by the propeller, jointly, backwardly form the second counteraction driving force. The first and the second counteraction driving forces together form an even larger backward counteraction driving force. In this embodiment, the transferring direction of the pressure difference and the direction of ejecting the fluid by the propeller can be the same, adding more force to the above driving force.

In summary, one of the advantages of the invention is to provide more lift force for the helicopter: The fluid flows in the lengthwise direction through the blade housing of the propeller. The plurality of the fluid inlets in the fluid passage and on the windward side. With the powerful action of the centrifugal force, the path where the fluid flows through the fluid passage and on the windward side is 10 times the path where the fluid flows over the leeward side in the widthwise direction of the blade housing. This generates a very large pressure difference and more lift force.

Furthermore, the action of the suction motor and the centrifugal force to generate extremely powerful suction force, the fluid on the windward side and the fluid in the fluid passage come together to form a fluid layer with higher speed. The fluid flows less fast over the leeward side at the natural status, forming an extremely pressure difference and thus adding more lift force and driving force to the aircraft and the helicopter.

This invention totally changes the concept for the aircraft and the future development. The power of the propeller-powered aircraft comes from the first forward driving force generated by the pressure difference, or the joint driving force formed by the first backward counteraction force generated by the pressure difference and the second counteraction force generated by the fluid discharge from the propeller. It obviously distinguishes from the prior art which only generates the counteraction force once.

The fluid flows through at least one fluid passage in the blade, like the fluid passing the bird's multilayered feathers which disconnect but also connect to one another. Such a configuration can avoid any stall phenomenon due to the fluid split from the feathers. The stall problem for the propeller, which has happened for hundred years, can be thereby resolved.

The high-speed fluid discharged from the fluid outlets of the propeller surrounds the periphery of low-speed fluid discharged by the propeller to form a fast circular fluid layer which concentrates without any diffusion. Thereby a greater driving force is jointly generated. The diffusion problem of the fluid discharged by the propeller for hundred years is thereby resolved, and the current disadvantage of small driving force can be improved.

The fluid ejected from the suction motor at high speed is surrounded by the fluid discharged by the propeller and having a less high speed to form a fast and circular fluid layer around the aircraft fuselage which can block at least most of the fluid resistance generated by the propeller to discharge the fluid toward the fuselage. Such a problem has never been resolved, The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A helicopter power device, comprising a propeller and a fuselage, the propeller comprising a cover body, a blade and a blade housing generating a first counteraction force, the helicopter power device being characterized in that a hollow fluid passage along a lengthwise direction of the blade is provided for the fluid to flow through; at least one fluid inlet is provided on a windward side of the blade; at least one fluid outlet is provided on a leeward side of the blade in a manner to communicate with the fluid inlet; and the fluid passage allows different paths for the fluid to pass in the lengthwise direction of the windward side and in the widthwise direction of the leeward side to generate a second counteraction force providing additional lift force.

2. The helicopter power device of claim 1, characterized in that the fluid passage is locally or wholly provided in the lengthwise direction of the blade.

3. The helicopter power device of claim 1, characterized in that a centerline of the fluid inlet is in parallel to the rotating direction of the propeller.

4. The helicopter power device of claim 1, characterized in that the fluid discharged by the fluid outlet surrounds the fluid discharged by the propeller to form a fluid layer which blocks the fluid discharged by the propeller from being diffused outward and generates a more powerful driving force.

5. The helicopter power device of claim 1, characterized in that a spoiler surface which increases the fluid path is further provided in the fluid passage, and the spoiler surface can be an arc, spiral, regular or irregular.

6. The helicopter power device of claim 1, characterized in that a suction motor, a connection tube and a suction tube are further comprised; the suction tube can be a spiral tube, a straight tube and an arc tube; the suction motor has a suction port communicating with the fluid passage; and the action of the suction motor in the lengthwise direction of the windward side of the blade and the natural status in the widthwise direction of the leeward side form a larger pressure difference to generate more power lift force.

7. The helicopter power device of claim 6, characterized in that the fluid passage has two sub-passages, one communicating with the fluid inlet and the other communicating with the suction motor; these two sub-layers communicate with each other; the fluid flows through at least one of the two sub-passages and then the fluid inlet communicating with the sub-passages so that the fluid will not split from the blade housing and no stall phenomenon will occur.

8. The helicopter power device of claim 6, characterized in that the suction motor is provided in the cover body; the suction port of the suction motor communicates with the suction tube disposed in the fluid passage; a discharge port of the suction motor communicates with a plurality of ejecting ports surrounding a lower part of the cover body; the fluid ejected by the ejecting ports next to the propeller to form a hollow fluid layer surrounding a fuselage, further blocking the fluid from entering the fuselage.

9. The helicopter power device of claim 6, characterized in that the suction motor is provided inside the fuselage or outside the fuselage, and the suction port of the suction motor communicates with the fluid passage through the connection tube.

10. An aircraft power device, comprising a propeller and a fuselage, the propeller comprising a plurality of blades generating a first counteraction force, the aircraft power device being characterized in that a hollow fluid passage along a lengthwise direction of the blade is provided for the fluid to flow through; the blade has at least one fluid net and at least one fluid outlet in a manner to communicate with each other; and the fluid passage allows different paths for the fluid to pass in the lengthwise direction of the windward side and in the widthwise direction of the leeward side to generate a second counteraction force providing additional lift force.

11. The aircraft power device of claim 10, characterized in that the fluid inlet is provided on a windward side of the blade in a manner to communicate with the fluid passage which is locally or wholly provided in the lengthwise direction of the blade.

12. The aircraft power device of claim 10, characterized in that the fluid outlet is provided on a leeward side of the blade in a manner to communicate with the fluid passage which is locally or wholly provided in the lengthwise direction of the blade.

13. The aircraft power device of claim 10, characterized in that a centerline of the fluid inlet is in parallel to the rotating direction of the propeller.

14. The aircraft power device of claim 10, characterized in that the fluid discharged by the fluid outlet surrounds the fluid discharged by the propeller to form a fluid layer which blocks the fluid discharged by the propeller from being diffused outward and generates a more powerful driving force.

15. The aircraft power device of claim 10, characterized in that a spoiler surface which increases the fluid path is further provided in the fluid passage, and the spoiler surface can be an arc, spiral, regular or irregular.

16. The aircraft power device of claim 10, characterized in that a suction motor, a connection tube and a suction tube are further comprised; the suction tube can be a spiral tube, a straight tube and an arc tube; the suction motor has a suction port communicating with the fluid passage; and the action of the suction motor in the lengthwise direction of the windward side of the blade and the natural status in the widthwise direction of the leeward side form a larger pressure difference to generate more power lift force.

17. The aircraft power device of claim 16, characterized in that the fluid passage has two sub-passages, one communicating with the fluid inlet and the other communicating with the suction motor; and these two sub-layers communicate with each other; the fluid flows through at least one of the two sub-passages and then the fluid inlet communicating with the sub-passages so that the fluid will not split from the blade and no stall phenomenon will occur.

18. The aircraft power device of claim 16, characterized in that the suction motor is provided in the cover body; the suction port of the suction motor communicates with the suction tube disposed in the fluid passage; a discharge port of the suction motor communicates with a plurality of ejecting ports surrounding a lower part of the cover body; and the fluid ejected by the ejecting ports next to the propeller to form a hollow fluid layer surrounding a fuselage, further blocking the fluid from entering the fuselage.

19. The aircraft power device of claim 16, characterized in that the suction motor is provided inside the fuselage or outside the fuselage, and the suction port of the suction motor communicates with the fluid passage through the connection tube.

* * * * *